(12) United States Patent
Matsunaga et al.

(10) Patent No.: US 8,407,380 B2
(45) Date of Patent: Mar. 26, 2013

(54) REMOTE OPERATION SYSTEM

(75) Inventors: Akihiro Matsunaga, Shinagawa (JP); Shinichi Katayama, Shinagawa (JP); Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 30 days.

(21) Appl. No.: 12/385,555

(22) Filed: Apr. 10, 2009

(65) Prior Publication Data

US 2009/0259792 A1    Oct. 15, 2009

(30) Foreign Application Priority Data

Apr. 10, 2008  (JP) ................. 2008-102775

(51) Int. Cl.
*G06F 3/00* (2006.01)
*G06F 15/16* (2006.01)
(52) U.S. Cl. .......................... 710/62; 709/227
(58) Field of Classification Search ............ 710/62
See application file for complete search history.

(56) References Cited

U.S. PATENT DOCUMENTS

| | | | | |
|---|---|---|---|---|
| 5,446,906 A | * | 8/1995 | Kardach et al. | 713/323 |
| 6,609,034 B1 | * | 8/2003 | Behrens et al. | 700/19 |
| 6,671,756 B1 | * | 12/2003 | Thomas et al. | 710/73 |
| 7,003,563 B2 | * | 2/2006 | Leigh et al. | 709/223 |
| 2005/0044236 A1 | * | 2/2005 | Stafford | 709/227 |
| 2005/0172039 A1 | * | 8/2005 | Hsu | 710/1 |

FOREIGN PATENT DOCUMENTS

| | | |
|---|---|---|
| JP | 7-271425 | 10/1995 |
| JP | 11-3102 | 1/1999 |
| JP | 2003-534685 | 11/2003 |
| WO | 01/84291 A1 | 11/2001 |

* cited by examiner

*Primary Examiner* — Henry Tsai
*Assistant Examiner* — Titus Wong
(74) *Attorney, Agent, or Firm* — Staas & Halsey LLP

(57) ABSTRACT

A remote operation system has a server, a client to which a first keyboard is connected, and a KVM switch connected to the server, the client and a second keyboard, the KVM switch including: an acquisition portion that acquires a state of the second keyboard; and the client including: a reception portion that receives a state of the first keyboard, and the state of the second keyboard from the KVM switch; a determination portion that determines whether the state of the first keyboard is identical with the state of the second keyboard; and a transmission portion that transmits information which makes the state of the first keyboard identical with the state of the second keyboard, to the first keyboard when the state of the first keyboard is not identical with the state of the second keyboard.

10 Claims, 8 Drawing Sheets

REMOTE OPERATION SYSTEM

BACKGROUND OF THE INVENTION

1. Field of the Invention

The present invention relates to a remote operation system having a server, a KVM (K:keyboard, V:video, M:mouse) switch, and a client.

2. Description of the Related Art

Conventionally, there has been known a system which includes a plurality of clients, a plurality of servers, a KVM switch switching communication between the clients and the servers (see Japanese Patent Application Publication No. 2003-534685).

In this type of system, one client is connected to a server selected by a user via the KVM switch. Then, when the user of the client operates a keyboard connected to the client to execute key input, a key code is transmitted to the selected server via the KVM switch. The server transmits screen data including letters and so on corresponding to the received key code to the client via the KVM switch. The screen data of the server is displayed on a monitor connected to the client. Therefore, when the user of the client executes the key input, the user of the client can browse the screen data of the server in which the contents of the key input are reflected, with the monitor connected to the client.

However, when the user of the client starts a remote operation, a state of the keyboard of the client may be not identical with a state of the keyboard of the server. This corresponds to a case where a "Caps Lock" key of the client is on, and a "Caps Lock" key of the server is off, for example. It should be noted that an LED showing a state of the "Caps Lock" key is provided on the keyboard of the client.

When the state of the keyboard of the client is not identical with the state of the keyboard of the server, and the user of the client executes the key input, input letters are different from letters displayed as the screen data of the server, thereby impairing usability. For example, when the "Caps Lock" key of the client is on, and the user of the client inputs a letter key of the alphabet, the user of the client expects that a capital letter of the alphabet will be displayed on the monitor. However, when the "Caps Lock" key of the server is off, a lowercase letter of the alphabet is displayed as the screen data of the server, and hence confusion is given to the user.

SUMMARY OF THE INVENTION

It is an object of the present invention to provide a remote operation system that can avoid key input that a user does not intend.

According to an aspect of the present invention, there is provided a remote operation system having a server, a client to which a first keyboard is connected, and a KVM switch connected to the server, the client and a second keyboard for operating the server, the KVM switch including: an acquisition portion that acquires a state of the second keyboard; and the client including: a reception portion that receives a state of the first keyboard from the first keyboard, and the state of the second keyboard from the KVM switch; a determination portion that determines whether the state of the first keyboard is identical with the state of the second keyboard; and a transmission portion that transmits information which makes the state of the first keyboard identical with the state of the second keyboard, to the first keyboard when the state of the first keyboard is not identical with the state of the second keyboard.

With the above arrangement, it is possible to make the state of the keyboard of the client identical with that of the keyboard of the server, and avoid the key input that the user does not intend.

According to another aspect of the present invention, there is provided a remote operation system having a server, a client to which a first keyboard is connected, and a KVM switch connected to the server, the client and a second keyboard for operating the server, the client including: a first reception portion that receives a state of the first keyboard; and a first transmission portion that transmits the state of the first keyboard to the KVM switch; and the KVM switch including: a second reception portion that receives the state of the first keyboard from the client; a determination portion that determines whether the state of the second keyboard is identical with the state of the first keyboard; and a second transmission portion that transmits information which makes the state of the second keyboard identical with the state of the first keyboard, to the server when the state of the second keyboard is not identical with the state of the first keyboard.

With the above arrangement, it is possible to make the state of the keyboard of the client identical with that of the keyboard of the server, and avoid the key input that the user does not intend.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

(First Embodiment)

Figure 1:
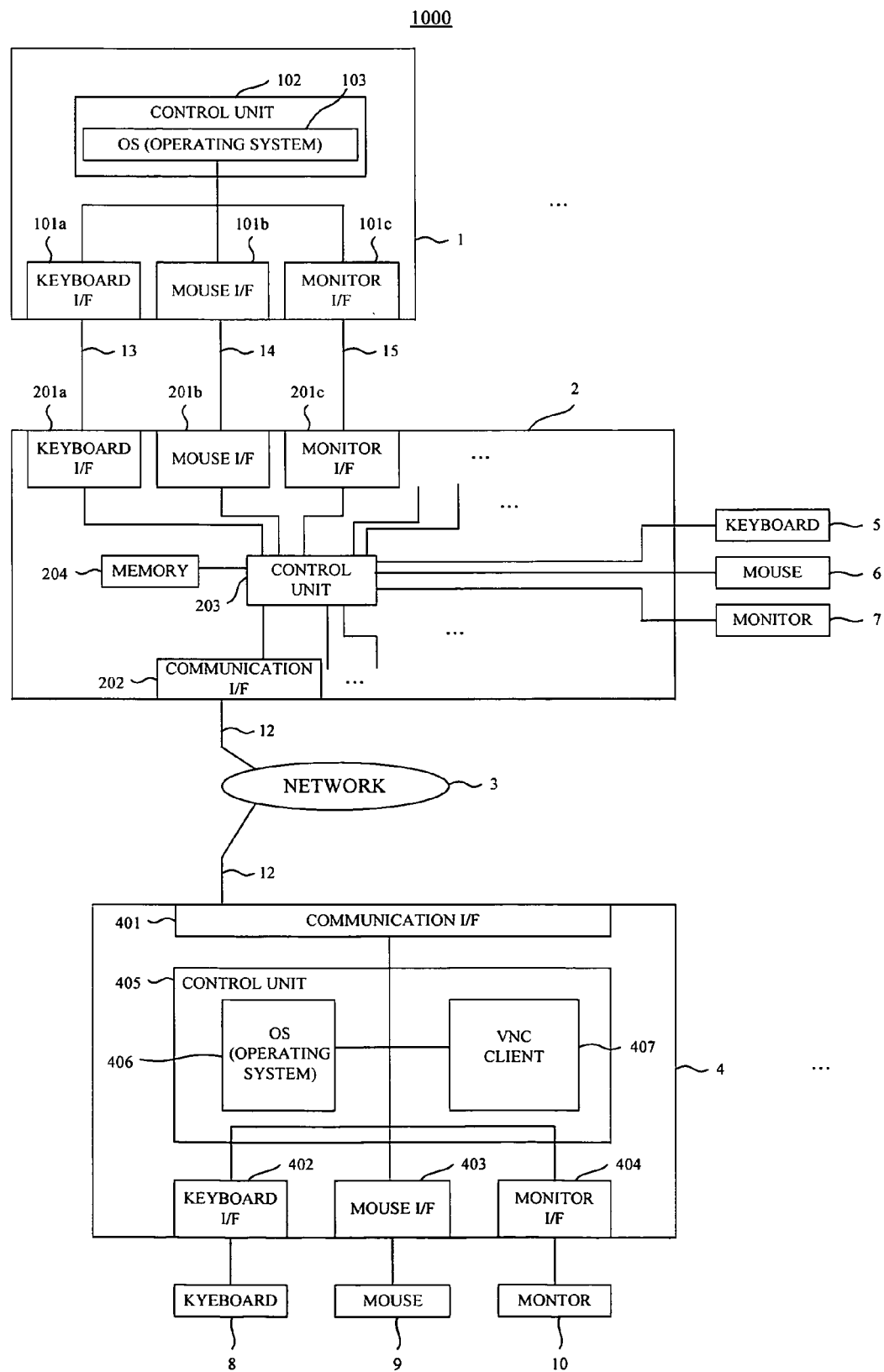
FIG. 1 is a schematic diagram showing the configuration of a remote operation system according to a first embodiment.

FIG. 1 is a schematic diagram showing the configuration of a remote operation system according to a first embodiment.

In FIG. 1, a remote system 1000 includes a server 1, a KVM switch 2, and a client 4. The server 1 is connected to the KVM switch 2 via cables 13 to 15. The client 4 is connected to the KVM switch 2 via a network 3 and LAN cables 12. Although the remote system 1000 includes the server 1 and the client 4 in FIG. 1, the remote system 1000 may include a plurality of servers and clients.

The server 1 includes: a keyboard interface (I/F) 101a to which the cable 13 is connected; a mouse interface (I/F) 101b to which the cable 14 is connected; a monitor interface (I/F) 101c to which the cable 15 is connected; and a control unit 102 that controls the entire server 1. The control unit 102 includes an OS (operating system) 103. Although the OS 103 is Windows (registered trademark), UNIX (registered trademark), MAC OS (registered trademark), or the like, the Windows is mainly used for the present embodiment. Screen data of the server 1 is transmitted to the KVM switch 2 via the monitor I/F 101c and the cable 15.

The KVM switch 2 is an IP-KVM switch connectable to the client 4 via the network 3. The KVM switch 2 includes: a keyboard interface (I/F) 201a that transmits a key code to the server 1; a mouse interface (I/F) 201b that transmits mouse data to the server 1; a monitor interface (I/F) 201c that receives the screen data from the server 1; a communication I/F 202 that receives the key code of a keyboard 8 from the client 4, and transmits the screen data from the server 1 to the client 4; a control unit 203 (an acquisition portion) that executes various kinds of processes, and controls the entire KVM switch 2 including the keyboard I/F 201a, the mouse I/F 201b, the monitor I/F 201c, and the communication I/F 202; and a memory 204 that stores various kinds of data. The control unit 203 is composed of a microcomputer, and the memory 204 is composed of a hard disk drive or a nonvolatile memory. A keyboard 5, a mouse 6, and a monitor 7 are connected to the control unit 203, and used by a user of the server 1 side, i.e., a local side. The key code from the keyboard 5 and the mouse data of the mouse 6 are transmitted to the server 1 via the keyboard I/F 201a and the mouse I/F 201b, respectively. The screen data of the server 1 is displayed on the monitor 7. It should be noted that the control unit 203 correspond to an acquisition portion, a second reception portion, a determination portion, and a second transmission portion.

It should be noted that the number of keyboard I/Fs 201a, the number of mouse I/Fs 201b, the number of monitor I/Fs 201c, and the number of communication I/Fs 202 are not limited to one, and a plurality of keyboard I/Fs 201a, a plurality of mouse I/Fs 201b, a plurality of monitor I/Fs 201c, and a plurality of communication I/Fs 202 may be provided. The plurality of keyboard I/Fs 201a, the plurality of mouse I/Fs 201 b, the plurality of monitor I/Fs 201c, and the plurality of communication I/Fs 202 are connected to a plurality of servers and clients.

The client 4 includes: a communication I/F 401 that transmits the key code from the keyboard 8 and mouse data from a mouse 9 to the KVM switch 2 via the network 3, and receives the screen data of the server 1 from the KVM switch 2 via the network 3; a keyboard I/F 402 that receives the key code from the keyboard 8; a mouse I/F 403 that receives the mouse data from the mouse 9; a monitor I/F 404 that outputs the screen data of the server 1 to a monitor 10; and a control unit 405 that controls the entire client 4. It should be noted that the control unit 405 corresponds to a reception portion, a determination portion, a transmission portion, a first reception portion, and a first transmission portion.

The control unit 405 includes: an OS 406 that includes a plurality of device drivers controlling the keyboard 8, the mouse 9, and the monitor 10; and a VNC client (i.e., an application for remote operation) 407 that causes the monitor 10 to display the screen data of the server 1, and executes the remote operation.

The screen data of the server 1 is displayed on the monitor 10 via the VNC client 407. The OS 406 receives the key code from the keyboard I/F 402, and outputs the key code to the VNC client 407. The OS 406 receives the mouse data from the mouse I/F 403, and outputs coordinate values of a mouse cursor to the VNC client 407. In addition, the OS 406 receives the key code and the coordinate values of the mouse cursor from the VNC client 407, and transmits the key code and the coordinate values to the communication I/F 401.

Figure 2:
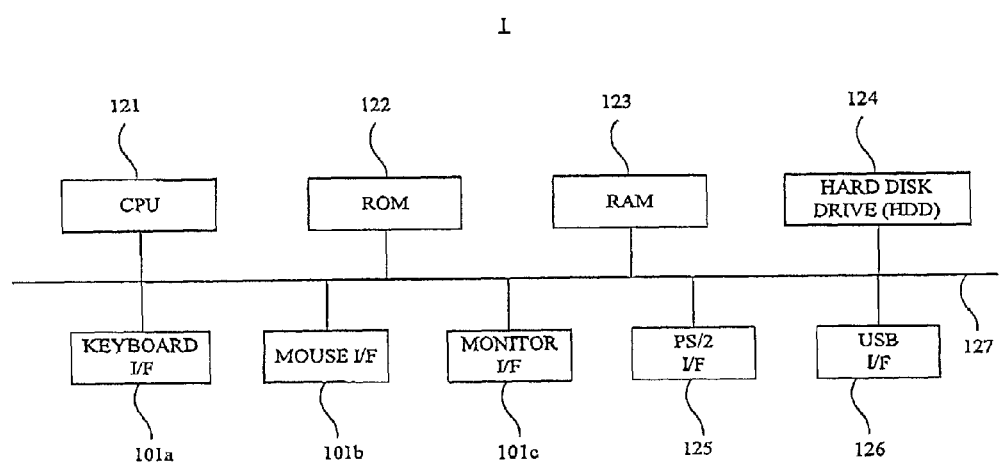
FIG. 2A is a block diagram showing the hardware configuration of a server 1.
FIG. 2B is a block diagram showing the hardware configuration of a client 4.
Figure 2:
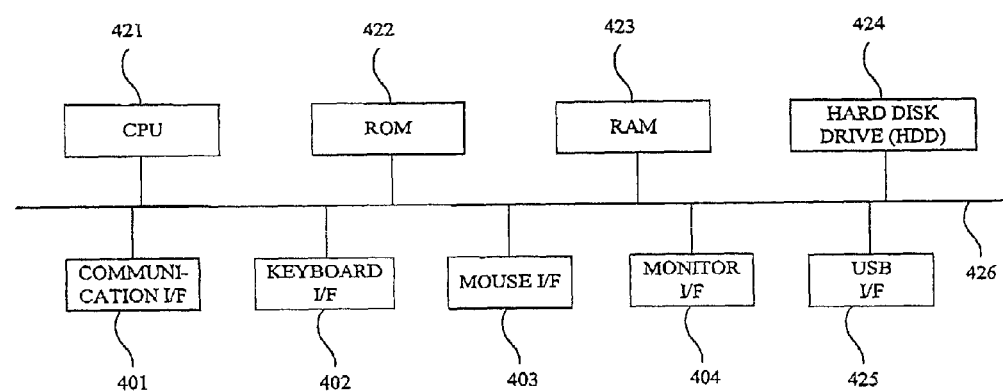

FIG. 2A is a block diagram showing the hardware configuration of the server 1, and FIG. 2B is a block diagram showing the hardware configuration of the client 4.

The server 1 includes: a keyboard I/F 101a; a mouse I/F 101b; a monitor I/F 101c; a CPU 121 that controls the entire server 1; a ROM 122 that stores a control program; a RAM 123 that functions as a working area; a hard disk drive (HDD) 124 that stores an exclusive device driver, a mouse class driver, an OS, and various kinds of information and programs; a PS/2 I/F 125; and a USB (Universal Serial Bus) I/F 126 that is connected to USB devices, not shown. The CPU 121 is connected to the keyboard I/F 101a, the mouse I/F 101b, the monitor I/F 101c, the ROM 122, the RAM 123, the HDD 124, the PS/2 I/F 125, and the USB I/F 126 via a system bus 127.

It should be noted that the CPU 121, the ROM 122, the RAM 123 and the HDD 124 correspond to the control unit 102, and the CPU 121 properly reads out the OS 103 from the HDD 124 and starts up the OS 103, so that the process executed with the OS 103 is achieved.

The client 4 includes: a communication I/F 401; a keyboard I/F 402; a mouse I/F 403; a monitor I/F 404; a CPU 421 that controls the entire client 4; a ROM 422 that stores a control program; a RAM 423 that functions as a working area; a hard disk drive (HDD) 424 that stores an OS, an application for remote operation, and various kinds of information and programs; and a USB I/F 425 that is connected to USB devices, not shown. The CPU 421 is connected to the communication I/F 401, the keyboard I/F 402, the mouse I/F 403, the monitor I/F 404, the ROM 422, the RAM 423, the HDD 424, and the USB I/F 425 via a system bus 426.

It should be noted that the CPU 421, the ROM 422, the RAM 423 and the HDD 424 correspond to the control unit 405, and the CPU 421 properly reads out the OS 406 or the VNC client 407 from the HDD 424 and starts up the OS 406 or the VNC client 407, so that the process executed with the OS 406 or the VNC client 407 is achieved.

Figure 3:
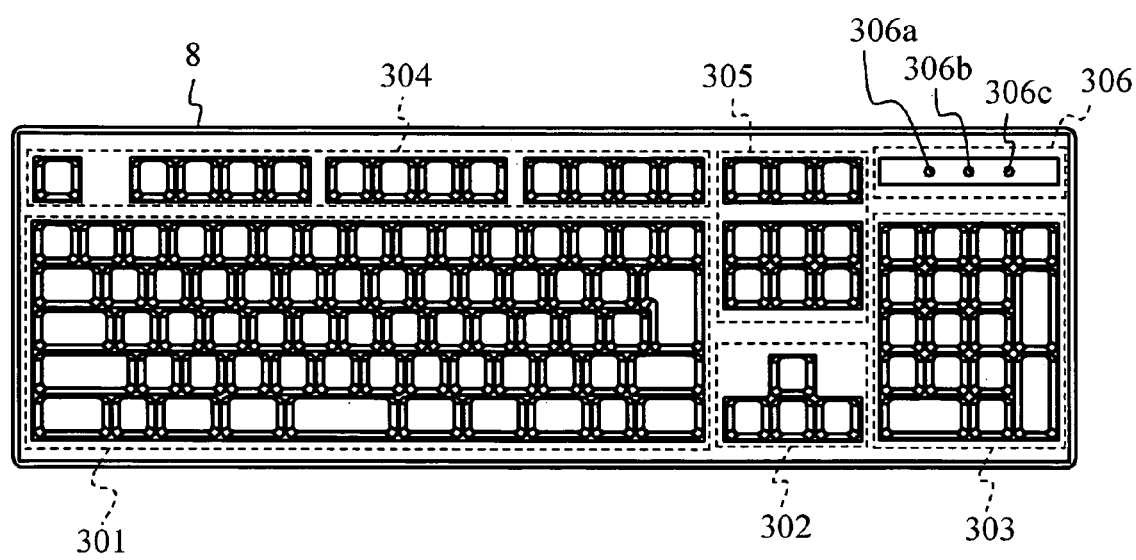
FIG. 3 is a diagram showing the apparent configuration of a keyboard 8.

FIG. 3 is a diagram showing the apparent configuration of the keyboard 8.

The keyboard 8 includes an alphabet input unit 301, a cursor key input unit 302, a ten key input unit 303, a function key input unit 304, a special key input unit 305, and an LED lighting unit 306. A "Num Lock" key is included in the ten key input unit 303. A "Caps Lock" key is included in the alphabet input unit 301. A "Scroll Lock" key is included in the special key input unit 305.

The LED lighting unit 306 includes: an LED lighting unit 306a showing an on/off state of the "Num Lock" key; an LED lighting unit 306b showing an on/off state of the "Caps Lock" key; and an LED lighting unit 306c showing an on/off state of the "Scroll Lock" key. Each of the LED lighting units 306a to 306c has an LED (light-emitting diode), and the on/off state of each key is represented by the lighting/lights-out of corresponding LED. It should be noted that the configuration of the keyboard 5 is the same as that of the keyboard 8, and hence a description thereof is omitted. It should be noted that the LED lighting units 306a to 306c correspond to a plurality of lighting portions.

The on/off control of the LED lighting units 306a to 306c is executed by the CPU 421. The on/off control of the LED lighting units 306a to 306c on the keyboard 5 is executed by the OS 103 of the server 1 via the control unit 203 of the KVM switch 2.

Figure 4A:
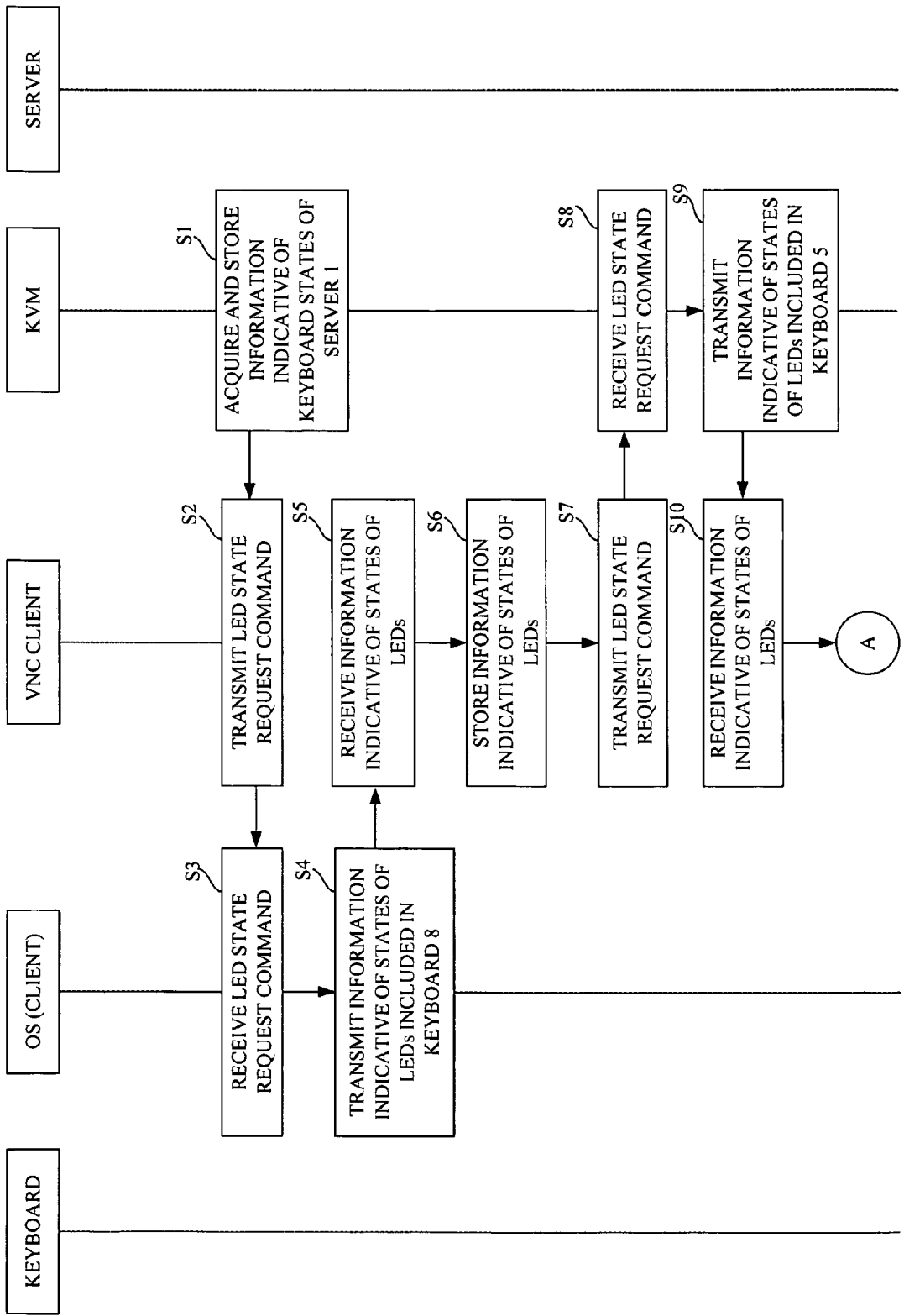
FIGS. 4A and 4B are flowcharts showing a process executed with the remote operation system.
Figure 4B:
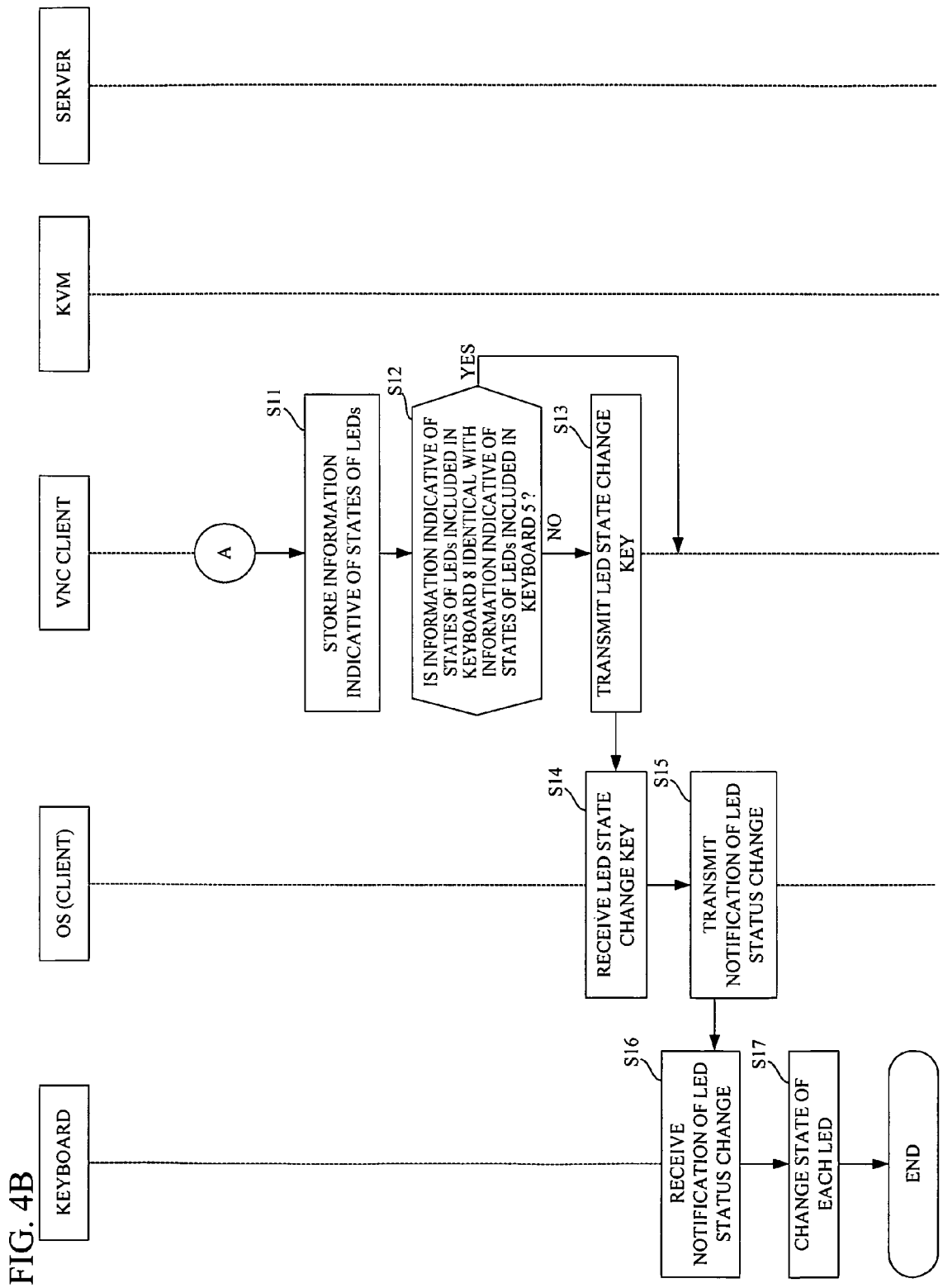

FIGS. 4A and 4B are flowcharts showing a process executed with the remote operation system. In the present flowcharts, the CPU 121 properly reads out the OS 406 or the VNC client 407 from the HDD 424, and starts up the OS 406 or the VNC client 407, so that the process executed with the OS 406 or the VNC client 407 is achieved.

First, when the power-on of the server 1 is detected, the control unit 203 of the KVM switch 2 acquires information indicative of keyboard states of the server 1 as an initial setting, and stores the information into the memory 204 (step S1). The information indicative of the keyboard states of the server 1 is information indicative of the states of the LEDs included in the keyboard (i.e., keyboard 5) of the server 1, and shows the on/off states of the "Num Lock" key, the "Caps Lock" key, and the "Scroll Lock" key.

The VNC client 407 transmits an LED state request command to the OS 406 (step S2). The OS 406 receives the LED state request command (step S3), and transmits the information indicative of the states of the LEDs included in the LED lighting units 306a to 306c, to the VNC client 407 (step S4).

Figure 5:
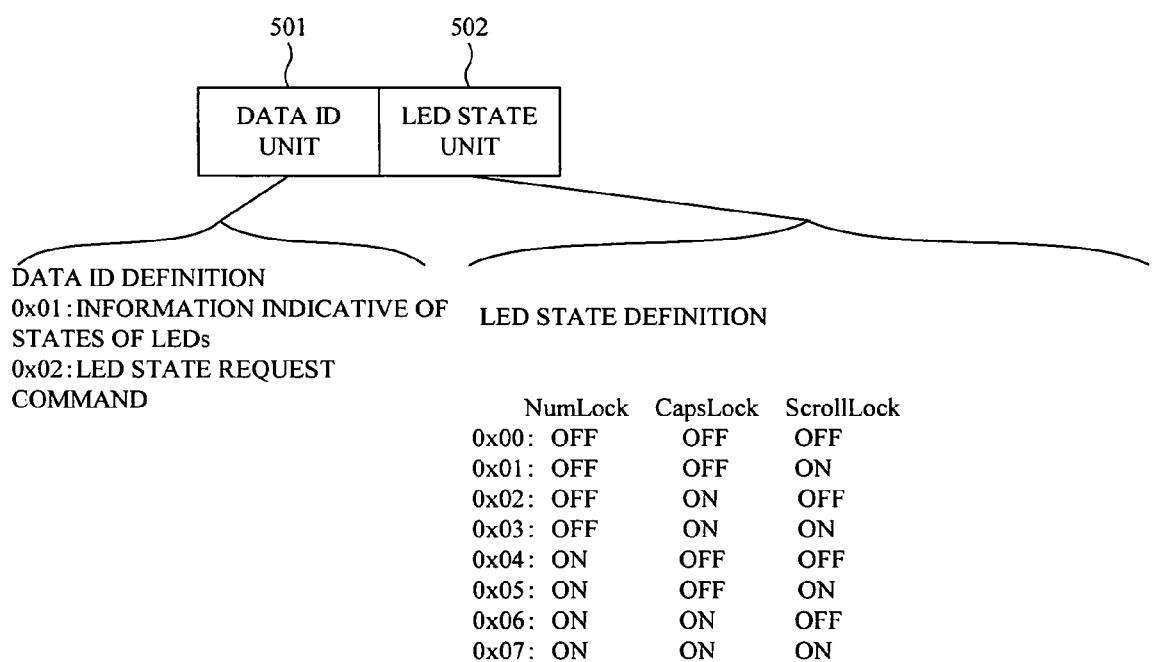
FIG. 5 is a diagram showing a format of a packet of information indicative of an LED state request command and states of LEDs.

Here, FIG. 5 shows a format of a packet of information indicative of the LED state request command and the states of the LEDs. The packet in FIG. 5 is composed of a data ID unit 501 in one byte and an LED state unit 502 in one byte.

When the packet is the information indicative of the states of the LEDs, data of "0x01" is input to the data ID unit 501 and data of any one of "0x01" to "0x07" is input to the LED state unit 502. When the packet is the information indicative of the LED state request command, data of "0x02" is input to the data ID unit 501 and no data is input to the LED state unit 502.

Referring again to FIG. 4A, the VNC client 407 receives the information indicative of the states of the LEDs from the OS 406 (step S5), and stores the information indicative of the states of the LEDs into the HDD 424 (step S6). By the procedures from step S2 to step S6, the VNC client 407 acquires the state of each LED, i.e., the state of the keyboard 8.

The VNC client 407 transmits the LED state request command to the KVM switch 2 (step S7). The control unit 203 of the KVM switch 2 receives the LED state request command (step S8), and transmits the information indicative of the states of the LEDs included in the keyboard of the server 1, stored into the memory 204, to the VNC client 407 (step S9).

The VNC client 407 receives the information indicative of the states of the LEDs from the KVM switch 2 (step S10), and stores the information indicative of the states of the LEDs into the memory 424 (step S11). By the procedures from step S8 to step S11, the VNC client 407 acquires the state of each LED, i.e., the state of the keyboard 5.

Next, the VNC client 407 determines whether the information indicative of the states of the LEDs included in the keyboard 8 received from the OS 406 is identical with the information indicative of the states of the LEDs included in the keyboard 5 received from the KVM switch 2 (step S12).

When the answer to the determination of step S12 is "YES", the process is terminated. On the other hand, when the answer to the determination of step S12 is "NO", the VNC client 407 transmits an LED state change key for changing the states of the LEDs on the keyboard 8, to the OS 406 (step S13). The LED state change key means codes of the "Num Lock" key, the "Caps Lock" key, and the "Scroll Lock" key. The LED state change key is transmitted in order to make the "Num Lock" key, the "Caps Lock" key, and the "Scroll Lock" key of the keyboard 8 identical with those of the keyboard 5, i.e., to make the keyboard states of the client identical with those of the server.

The codes to be transmitted as the LED state change key is automatically or manually changed by the VNC client 407 depending on a type of the OS 406. For example, when the OS 406 is Japanese version Windows (registered trademark) (i.e., all device drivers and optional languages, etc. are set to a Japanese environment), and the state of the LED of the "Caps Lock" key is changed, the VNC client 407 transmits the codes of a "Shift" key and the "Caps Lock" key to the OS 406. On the other hand, when the OS 406 is English version Windows (registered trademark), and the state of the LED of the "Caps Lock" key is changed, the VNC client 407 transmits only the code of the "Caps Lock" key to the OS 406.

The OS 406 receives the LED state change key from the VNC client 407 (step S14), and transmits the notification of the LED status change to the keyboard 8 (step S15).

The keyboard 8 receives the notification of the LED status change (step S16), and changes the state of each LED based on the notification of the LED status change (step S17). Then, the present process is terminated.

When the activation of the VNC client 407 is terminated (i.e., termination time of the remote control), the VNC client 407 returns the current states of the LEDs on the keyboard 8 to the states of the LEDs on the keyboard 8 received at the time of start of the remote control. Thereby, when another application is operated by the keyboard 8, it is possible to prevent a gap by the operation of the application from occurring.

According to the present embodiment, the KVM switch 2 acquires the states of the keyboard 5, and the control unit 405 of the client 4 receives the states of the keyboard 8 from the OS 406 and the states of the keyboard 5 from the KVM switch 2, and determines whether the states of the keyboard 8 are identical with those of the keyboard 5. When the states of the keyboard 8 are not identical with those of the keyboard 5, the VNC client 407 transmits the information (i.e., key code) which makes the states of the keyboard 8 identical with those of the keyboard 5, to the OS 406. Then, the states of the keyboard 8 are changed by the control of the OS 406, so that the OS 406 transmits the notification of the LED status change to the keyboard 8.

Therefore, it is possible to make the states of the keyboard of the client identical with those of the keyboard of the server, and avoid the key input that the user does not intend.

As a variation example, at the time of start of the remote operation, the VNC client may transmit the LED state change key to the OS 406 and the KVM switch 2 based on preset states of the LEDs (e.g. the "Num Lock" key: ON, the "Caps Lock" key: OFF, and the "Scroll Lock" key: OFF), and change the states of the LED lighting units 306a to 306c included in the respective keyboards 5 and 8. Thereby, the user can execute the key input in a predetermined state.

(Second Embodiment)

In the above-mentioned first embodiment, the states of the LEDs on the keyboard 8 of the client 4 is changed according to the states of the LEDs on the keyboard 5 of the server 1. On the contrary, in the present embodiment, the states of the LEDs on the keyboard 5 of the server 1 is changed according to the states of the LEDs on the keyboard 8 of the client 4.

The configuration of the remote operation system according to the second embodiment is the same as that of the remote operation system according to the first embodiment, and hence a description thereof is omitted.

Figure 6A:
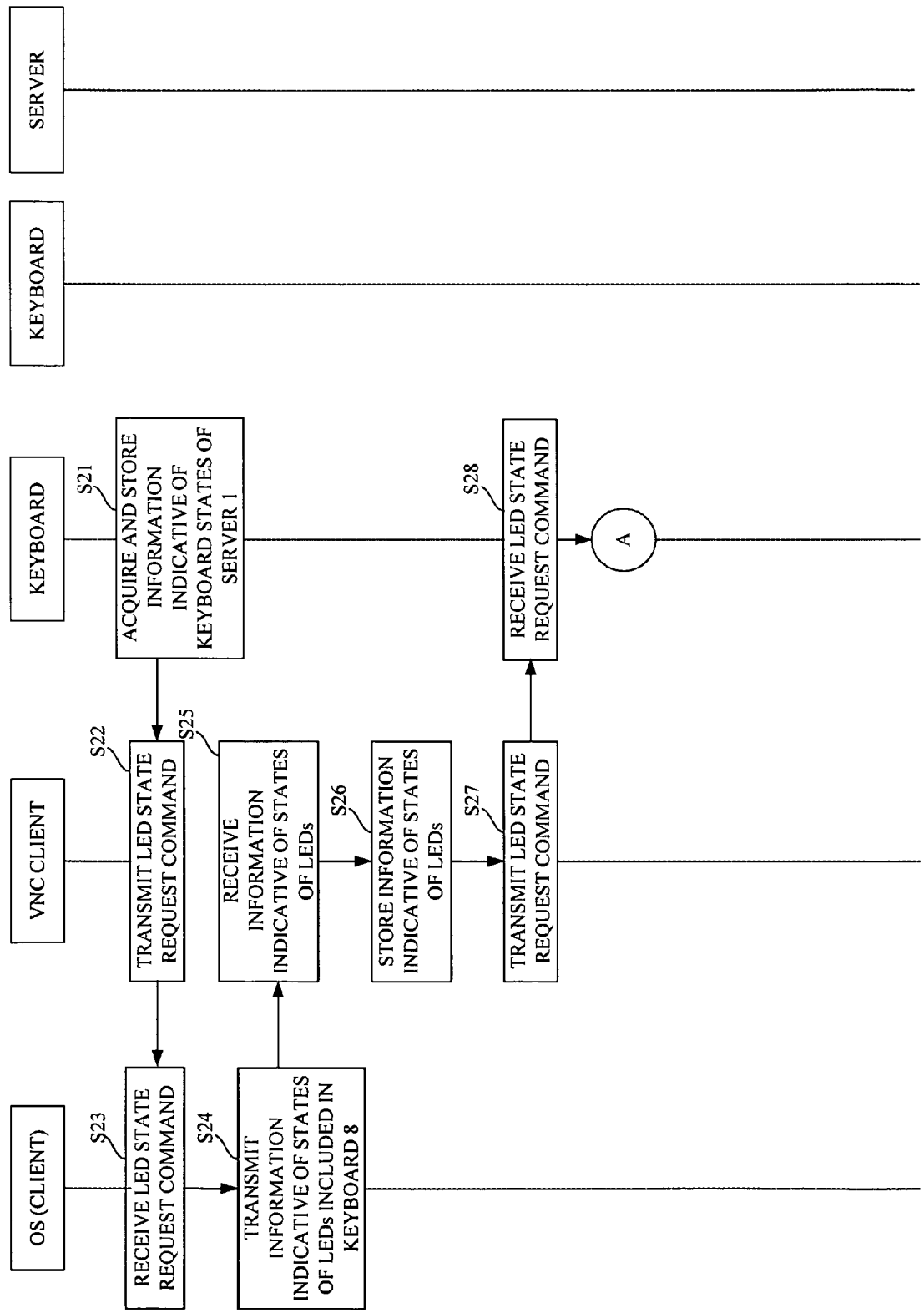
FIGS. 6A and 6B are flowcharts showing a process executed with the remote operation system according to a second embodiment.
Figure 6B:
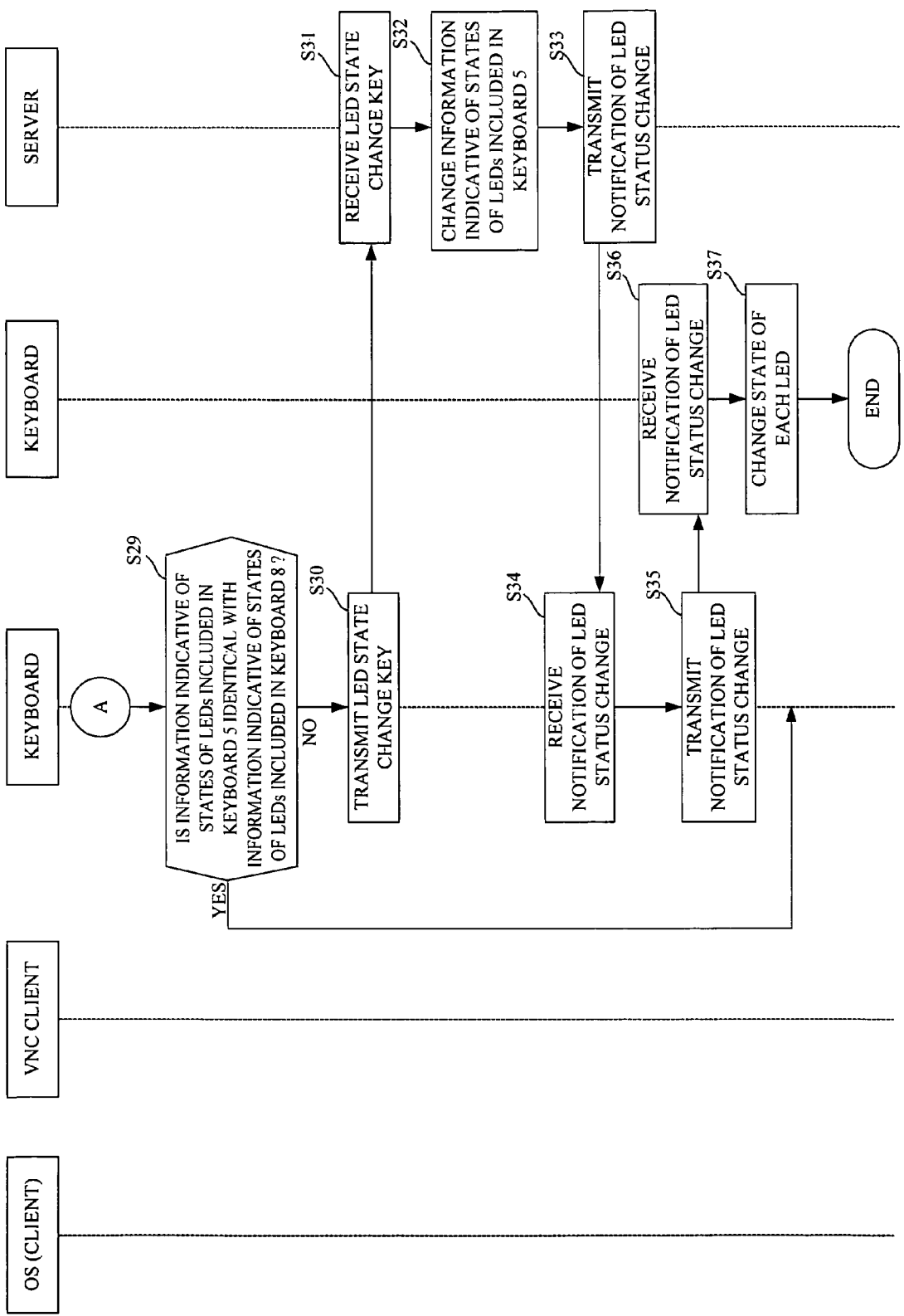

FIGS. 6A and 6B are flowcharts showing a process executed with the remote operation system according to the second embodiment. In the present flowcharts, the CPU 121 properly reads out the OS 406 or the VNC client 407 from the HDD 424, and starts up the OS 406 or the VNC client 407, so that the process executed with the OS 406 or the VNC client 407 is achieved.

First, when the power-on of the server 1 is detected, the control unit 203 of the KVM switch 2 acquires information indicative of keyboard states of the server 1 as an initial setting, and stores the information into the memory 204 (step S21). The information indicative of the keyboard states of the server 1 is information indicative of the states of the LEDs included in the keyboard (i.e., keyboard 5) of the server 1, and shows the on/off states of the "Num Lock" key, the "Caps Lock" key, and the "Scroll Lock" key.

The VNC client 407 transmits an LED state request command to the OS 406 (step S22). The OS 406 receives the LED state request command (step S23), and transmits the information indicative of the states of the LEDs included in the LED lighting units 306a to 306c, to the VNC client 407 (step S24). A packet of information indicative of the LED state request command and the states of the LEDs is the same as the packet in FIG. 5.

The VNC client 407 receives the information indicative of the states of the LEDs included in the keyboard 8 from the OS 406 (step S25), and stores the information indicative of the states of the LEDs into the HDD 424 (step S26). By the procedures from step S22 to step S26, the VNC client 407 acquires the state of each LED, i.e., the state of the keyboard 8.

The VNC client 407 transmits the information indicative of the states of the LEDs included in the keyboard 8 to the KVM switch 2 (step S27). The control unit 203 of the KVM switch 2 receives the information indicative of the states of the LEDs included in the keyboard 8 (step S28).

The control unit 203 determines whether the information indicative of the states of the LEDs included in the keyboard 5 stored into the memory 204 is identical with the information indicative of the states of the LEDs included in the keyboard 8 received from the OS 406 (step S29).

When the answer to the determination of step S29 is "YES", the process is terminated. On the other hand, when the answer to the determination of step S29 is "NO", the control unit 203 transmits an LED state change key for changing the states of the LEDs on the keyboard 5, to the OS 103 of the server 1 (step S30). The LED state change key means codes of the "Num Lock" key, the "Caps Lock" key, and the "Scroll Lock" key. The LED state change key is transmitted in order to make the "Num Lock" key, the "Caps Lock" key, and the "Scroll Lock" key of the keyboard 5 identical with those of the keyboard 8, i.e., to make the keyboard states of the server identical with those of the client.

The codes to be transmitted as the LED state change key is automatically or manually changed by the control unit 203 depending on a type of the OS 103. For example, when the OS 103 is Japanese version Windows (registered trademark) (i.e., all device drivers and optional languages, etc. are set to a Japanese environment), and the state of the LED of the "Caps Lock" key is changed, the control unit 203 transmits the codes of a "Shift" key and the "Caps Lock" key to the OS 103. On the other hand, when the OS 103 is English version Windows (registered trademark), and the state of the LED of the "Caps Lock" key is changed, the control unit 203 transmits only the code of the "Caps Lock" key to the OS 103.

The OS 103 receives the LED state change key from the KVM switch 2 (step S31), changes information indicative of the states of the LEDs stored into the OS 103 (step S32), and transmits the notification of the LED status change to the control unit 203 of the KVM switch 2 (step S33).

The control unit 203 receives the notification of the LED status change (step S34), and transmits the notification of the LED status change to the keyboard 5 (step S35).

The keyboard 5 receives the notification of the LED status change (step S36), and changes the state of each LED based on the notification of the LED status change (step S37). Then, the present process is terminated.

When the activation of the VNC client 407 is terminated (i.e., termination time of the remote control), the control unit 102 of the server 1 returns the current states of the LEDs on the keyboard 5 to the states of the LEDs on the keyboard 5 received at the time of start of the remote control. Thereby, when another application is operated by the keyboard 5, it is possible to prevent a gap by the operation of the application from occurring.

According to the present embodiment, the client 4 receives the states of the keyboard 8, and transmits the states of the keyboard 8 to the KVM switch 2. The KVM switch 2 receives the states of the keyboard 8 from the client 4, acquires the states of the keyboard 5, and determines whether the states of the keyboard 5 is identical with those of the keyboard 8. When the states of the keyboard 5 is not identical with those of the keyboard 8, the KVM switch 2 transmits the information which makes the states of the keyboard 5 identical with those of the keyboard 8, to the OS 103 of the server 1. Thereby, the states of the keyboard 5 are changed, and the OS 103 transmits the notification of the LED status change to the keyboard 5 via the control unit 203 of the KVM switch 2.

Therefore, it is possible to make the states of the keyboard of the client identical with those of the keyboard of the server, and avoid the key input that the user does not intend.

As a variation example, at the time of start of the remote operation, the KVM switch 2 may make the states of the keyboard 5 identical with preset states of the LEDs (e.g. the "Num Lock" key: ON, the "Caps Lock" key: OFF, and the "Scroll Lock" key: OFF), transmit the LED state change key to the OS 406 based on the preset states of the LEDs, and change the states of the LED lighting units 306a to 306c included in the respective keyboards 5 and 8. Thereby, the user can execute the key input in a predetermined state.

Recording media on which the software programs for realizing the functions of the server 1, the KVM switch 2 and the client 4 are recorded may be supplied to the server 1, the KVM switch 2 and the client 4, respectively. Each of the control units in the server 1, the KVM switch 2 and the client 4 may read and execute the corresponding program recorded on each recording media. In this manner, the same effects as those of the above-described first and second embodiments can be achieved. Each of the recording media for providing the programs may be a CD-ROM, a DVD, or a SD card, for example.

The control units in the server 1, the KVM switch 2 and the client 4 may execute the respective software programs for realizing the functions of the server 1, the KVM switch 2 and the client 4. In this manner, the same effects as those of the above-described first and second embodiments can also be achieved.

It should be noted that the present invention is not limited to the embodiment, and various modifications may be made to them without departing from the scope of the invention.

The Present application is based on Japanese Patent Application No. 2008-102775 filed Apr. 10, 2008, the entire disclosure of which is hereby incorporated by reference.

What is claimed is:

1. A remote operation system, comprising:
   a server;
   a client to which a first keyboard is connected, the first keyboard including a plurality of keys and a plurality of lighting portions each of which corresponds to one of the plurality of keys that light up depending on depression of a corresponding key;

a keyboard/video/mouse (KVM) switch connected to the server, the client and a second keyboard for operating the server, the second keyboard including a plurality of keys and a plurality of lighting portions each of which corresponds to one of the plurality of keys that light up depending on depression of a corresponding key;

the KVM switch including:
an acquisition portion that acquires a state of the second keyboard when the server is switched on; and the client including:
a reception portion that receives a state of the first keyboard from the first keyboard, and the state of the second keyboard from the KVM switch;
a determination portion that determines whether the state of the first keyboard is identical with the state of the second keyboard;
a transmission portion that transmits command information which controls the state of the first keyboard to be identical with the state of the second keyboard when the state of the first keyboard is not identical with the state of the second keyboard; and
a changing portion that selectively changes the command information to be transmitted to the first keyboard in accordance with at least one of a language type and a version of an operating system of the client; and
the client sets the state of the first keyboard to be identical with a preset state, and transmits information which sets the state of the second keyboard identical with the preset state to the KVM switch at a time of start of remote operation.

2. The remote operation system as claimed in claim 1, a state of each of the first keyboard and the second keyboard indicates a corresponding state of the plurality of lighting portions included in each of the first keyboard and the second keyboard.

3. The remote operation system as claimed in claim 2, wherein at a time of termination of remote operation, the client returns current states of the plurality of lighting portions of the first keyboard to states of the plurality of lighting portions of the first keyboard received at the time of start of the remote operation.

4. The remote operation system as claimed in claim 1, wherein at a time of termination of remote operation, the client returns current states of the plurality of lighting portions of the first keyboard to states of the plurality of lighting portions of the first keyboard received at the time of start of the remote operation.

5. A remote operation system comprising:
a server;
a client to which a first keyboard is connected, the first keyboard including a plurality of keys and a plurality of lighting portions each of which corresponds to one of the plurality of keys that light up depending on depression of a corresponding key;
a keyboard/video/mouse (KVM) switch connected to the server, the client and a second keyboard for operating the server, the second keyboard including a plurality of keys and a plurality of lighting portions each of which corresponds to one of the plurality of keys that light up depending on depression of a corresponding key;
the client including:
a first reception portion that receives a state of the first keyboard; and
a first transmission portion that transmits the state of the first keyboard to the KVM switch; and
the KVM switch including:
a second reception portion that receives the state of the first keyboard from the client;
a determination portion that determines whether a state of the second keyboard is identical with the state of the first keyboard;
a second transmission portion that transmits command information which controls the state of the second keyboard to be identical with the state of the first keyboard when the state of the second keyboard is not identical with the state of the first keyboard; and
a changing portion that selectively changes the command information to be transmitted to the second keyboard in accordance with at least one of a language type and a version of an operating system of the server; and
the KVM switch sets the state of the second keyboard to be identical with a preset state, and transmits information which sets the state of the first keyboard identical with the preset state to the client at a time of start of remote operation.

6. The remote operation system as claimed in claim 5, wherein a state of each of the first keyboard and the second keyboard indicates a corresponding state of the plurality of lighting portions included in each of the first keyboard and the second keyboard.

7. The remote operation system as claimed in claim 6, wherein at a time of termination of remote operation, the client returns current states of the plurality of lighting portions of the second keyboard to states of the plurality of lighting portions of the second keyboard received at the time of start of the remote operation.

8. The remote operation system as claimed in claim 5, wherein at a time of termination of remote operation, the client returns current states of the plurality of lighting portions of the second keyboard to states of the plurality of lighting portions of the second keyboard received at the time of start of the remote operation.

9. A remote operation system comprising:
a client having a first keyboard, wherein the client includes a changing portion that selectively changes command information to be transmitted to the first keyboard in accordance with at least one of a language type and a version of an operating system of the client and where the command information controls a state of the first keyboard to be identical with a state of at least one additional keyboard when the state of the first keyboard is not identical with the state of the at least one additional keyboard; and
a keyboard/video/mouse (KVM) switch connected with the client and the least one additional keyboard for operating a server, the KVM switch acquiring a state of the at least one additional keyboard when the server is switched on,
where the first keyboard includes a plurality of keys and a plurality of lighting portions each of which corresponds to one of the plurality of keys that light up depending on depression of a corresponding key and the at least one additional keyboard includes a plurality of keys and a plurality of lighting portions each of which corresponds to one of the plurality of keys that light up depending on depression of a corresponding key,
where an input using the at least one additional keyboard of the server causes an input via the first keyboard to be identical to the input of the at least one additional keyboard by setting states of LED portions of the first keyboard to be identical to LED portions of the at least one additional keyboard based on the command information transmitted to the first keyboard, and where the client sets the state of the first keyboard to be identical with a preset state, and transmits information which sets the state of the at least one additional keyboard identical with the preset state to the KVM switch at a time of start of remote operation.

10. The remote operation system of claim 9, wherein the preset state indicates an operation state of at least one key of the first keyboard.

* * * * *